United States Patent [19]
Garwin et al.

[11] 4,097,115
[45] Jun. 27, 1978

[54] OPTICAL SCANNING DEVICE FOR PRODUCING A MULTIPLE LINE SCAN USING A LINEAR ARRAY OF SOURCES AND A TEXTURED SCANNED SURFACE

[75] Inventors: Richard Lawrence Garwin, Scarsdale; James Lewis Levine, Yorktown Heights, both of N.Y.

[73] Assignee: International Business Machines Corporation, Armonk, N.Y.

[21] Appl. No.: 742,935

[22] Filed: Nov. 18, 1976

[51] Int. Cl.² .................. G02B 27/17; H04N 3/34; H04N 3/08; H04N 9/14
[52] U.S. Cl. .................................. 350/6.7; 358/206; 358/231; 358/63
[58] Field of Search ............ 350/6, 7, 285, 167, 350/123, 127, 128, 129, 117; 358/205–208, 231, 63; 250/483, 484, 486; 313/371, 474; 352/106–108

[56] References Cited
U.S. PATENT DOCUMENTS

| | | | |
|---|---|---|---|
| 1,934,821 | 11/1933 | Rudenberg | 250/486 |
| 1,996,492 | 4/1935 | Schroter | 358/206 |
| 2,141,746 | 12/1938 | Gray | 358/206 |
| 2,552,455 | 5/1951 | Pond | 350/129 |

*Primary Examiner*—Jon W. Henry
*Attorney, Agent, or Firm*—John J. Goodwin

[57] ABSTRACT

A system for producing a two-dimensional multiple line display by scanning a single source or a plurality of linearly arrayed sources with a first rotating or nutating reflective element to reflect the single source or the plurality of independent sources across a screen to produce a display consisting of a single line array in the case of a single source or a band of lines in the case of a plurality of sources. A second rotating or nutating reflective element is employed to reflect the display on the screen to produce a two-dimensional multiple line image of the single line display or a two-dimensional multiple band array of the band of lines.

8 Claims, 4 Drawing Figures

OPTICAL SCANNING DEVICE FOR PRODUCING A MULTIPLE LINE SCAN USING A LINEAR ARRAY OF SOURCES AND A TEXTURED SCANNED SURFACE

BACKGROUND OF THE INVENTION

1. Field of the Invention

The present invention relates to optical scanning devices in general and, in particular, to rotary optical scanning devices including reflective elements for displaying a two-dimensional image of a single or a multiple source array.

2. Description of the Prior Art

It is known that optical displays can be produced by rotating or nutating a mirror or a prism in order to direct a light source to a number of positions on a screen or in a viewing plane in a synchronous manner.

U.S. Pat. No. 2,588,740 issued Mar. 11, 1952 to W. A. R. Malm entitled *Kineto-Optical Scanning With Modulated Light Beam In Television Image Projection*, U.S. Pat. No. 3,746,421 issued July 17, 1973 to John R. Yoder, entitled *Multiple Line Rotating Polygon* and U.S. Pat. No. 3,828,124 issued Aug. 6, 1974 to Richard C. Bawm, entitled *Decreased Rotation Rate Scanning*.

The prior art falls into three general categories. In one category a single light source is scanned by a rotating or vibrating mirror or prism to produce a single line scan. This results in a one dimensional display. In another category a single light source is reflected or deflected in a first direction and then in a second orthogonal direction to produce a two dimensional display in a manner similar to a CRT raster. This tends to result in flicker, which can be overcome only by the use of difficult and expensive high scanning and modulation rates. Also, since the single source must be used to sequentially illuminate the entire raster, the source must be of high intensity which could be harmful to a viewer in the event that scanning is interrupted. In a third category, an entire line of light sources is scanned by a single mirror or prism to reproduce the line in two dimensions.

The present invention is distinct from the prior art in that a combined and cooperative scanning scheme is employed wherein a single light source is first scanned into a line, and then the resultant line is scanned to produce a two-dimensional display or image. Alternatively, the original source may be a linear array of separate sources which are scanned into a band of lines, and the band of lines is then scanned to produce a display or image of a plurality of bands of lines.

SUMMARY OF THE INVENTION

An object of the present invention is to provide a optical display system for scanning one or more independently modulated light sources using orthogonal optical scanners.

Another object of the present invention is to provide an optical display system including a first rotating or nutating reflective means for scanning one or more modulated light sources for producing a first display representing a plurality of the one or more light sources and a second rotating or nutating reflective means for scanning the display for producing a second display representing a plurality of the first display.

A further object of the present invention is to provide an optical display system employing N independently modulated light sources wherein the modulation rate is N times slower, the scan rate is N times slower and the image intensity N times brighter than for a display using a single source.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
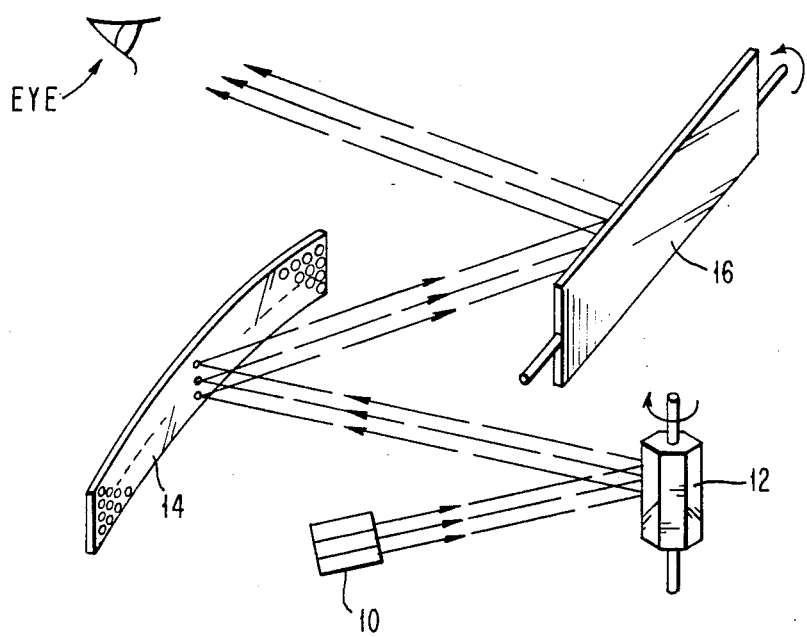
FIG. 1 is a perspective view of an illustrative example of a system for providing an optical display according to the principles of the present invention.

FIG. 1 illustrates just one example of an optical display system for producing a two-dimensional display from a linear array of a plurality of independently modulated light sources. The array of light sources 10 are disposed, for example, in a vertical arrangement. The light sources 10 may be lasers which produce collimated light beams, light emitting diodes provided with collimating lenses, or the light may be derived from a single source and divided into a plurality of beams with a modulator provided for each beam provided the light is originally collimated or is collimated by suitable lenses.

The light beams from light source 10 are directed onto a vertical reflective means 12 which completely rotates about its axis or nutates or rotates back and forth through an angle about its axis such as by vibration to scan the light beams in a horizontal direction. Again, by way of example, the reflective means 12 is illustrated as a rotated multi-faceted mirror arrayed vertically and which rotates to provide a first selected scan rate. The light beams from source 10 are reflected onto a suitable horizontal display screen 14. In FIG. 1, the illustration depicts the beams being reflected at one instant of time to provide one vertical column of display points. In operation over the scanning period the display screen 14 will include a two dimensional array of points wherein each column includes the number of source beams and the number of such columns appearing on the screen from right to left is determined by the rotational scan rate of reflective means 12. Thus, a two-dimensional display of light points appears on screen 14 wherein the number of rows of the display is a factor of the number of light source beams and the number of columns of the display is a factor of the scan rate. The presence or absence of a point of light in a row and column position on the screen 14 is determined by the modulation of the light sources 10. The two-dimensional array of points displayed on screen 14 will be referred to as a "band".

If the light beams incident on screen 14 are well collimated and screen 14 were a specular reflector, then the image of each spot would be visible only from a single viewing position, different for each spot, satisfying the usual laws of reflection. It is desired that all the spots in the band on screen 14 be viewable from a single observer position. Therefore the screen 14 is provided with a textured surface providing a controlled degree of scattering power with or without deflection for the central ray illuminating each image element.

A second reflecting means 16 such as a rotating or nutating mirror is provided along a horizontal axis for scanning the band of points displayed on screen 14 in a vertical direction such that when reflecting means 16 is viewed, a plurality of bands of points is seen.

It was previously stated that screen 14 may be textured to provide controlled scattering. More particularly, it is desirable to fill reflecting means 16 in the vertical direction from each spot, but not in the horizontal direction. Thus, screen 14 may be textured to contain depressions (e.g. sections of ellipsoids) which are longer in the horizontal direction than the vertical, and tilted in a direction as to direct the light towards a viewing position near the center of screen. This result may be enhanced by employing a curved screen. It is also possible still further to economize on light output by using a small prism, mirror or vibrating cylinder lens close to the (transmissive or reflective) screen 14 to divert the central (vertical) ray of the intermediate image to that part of scanner means 16 which is imaging 14 as viewed by the eye.

Figure 2:
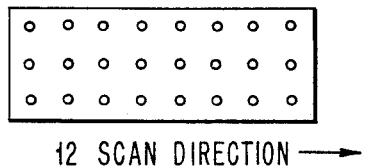
FIGS. 2, 3 and 4 are schematic representations of displays or images capable of being produced by an optical display system according to the principles of the present invention.
Figure 3:
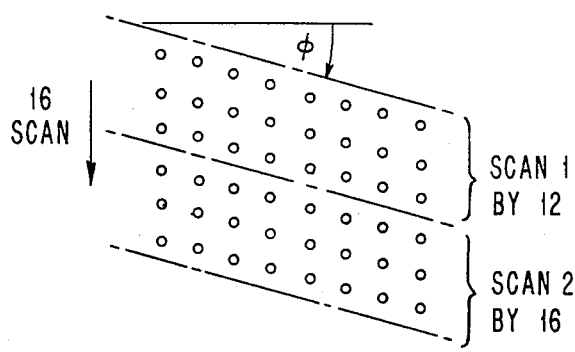

FIG. 2 illustrates an image display which can be produced on screen 14 by the optical system shown in FIG. 1 for N light sources where N is three. The display on screen 14 is horizontal, however, the second reflecting means 16 scans continously, therefore the final image will be slanted as shown in FIG. 3. For a small number of N sources this distortion can be tolerated, but will become excessive for the useful case of large N.

Figure 4:
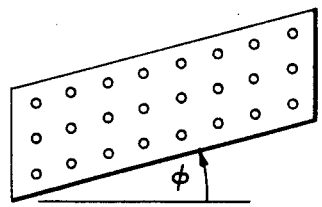

The angle $\phi$ at which the image slants is expressed tan $\phi = N/M$ where N is the number of sources 10 and M is the number of addressable spots in the horizontal direction, the spacing of the points in the vertical and horizontal direction being equal. The slant can be corrected by tilting the various elements of the system. For example, if the screen 14 is tilted through the angle $\phi$ but in the opposite direction relative to the axis of reflective means 16 and if the axis of reflective means 12 is tilted by the same angle in order to scan the array onto screen 14 and finally, if the array on screen 14 is tilted such that the images of the array on screen 14 are vertical, as shown in FIG. 4, then the final image will consist of a rectangular grid.

The present invention also operates to provide a two-dimensional display from a modulated single light source. If a single light source were employed instead of the plurality of sources 10 in FIG. 1, or if only one of the plurality of sources 10 were utilized in a particular application, single rows of points would be displayed on screen 14. When the single rows on screen 14 are synchronously scanned by reflective means 16, an image in the form of a two-dimensional band of points is displayed to the observer.

One skilled in the art will appreciate that variations in the structures illustrated in FIG. 1 are possible within the scope of the invention. For example, the vertical and horizontal arrangements of the elements are not limitations as long as the orthogonal relationship is maintained. Also, the number of reflective surfaces used on elements 12 and 16 may be varied as well as the relative scanning rates. Screen 14 may be replaced by a transmission screen and reflective means 16 would then be disposed on the other side of screen 14.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical scanning system for producing a multiple line two-dimensional array of display points comprising:
   at least one modulated light source,
   a display screen having a textured surface for providing a controlled light scattering,
   a first light deflecting means periodically rotating about an axis for scanning said at least one modulated light from said light source source and deflecting said light in a first linear direction across said display screen to produce a display of at least one row of display spots,
   and a second light deflecting means periodically rotating about an axis orthogonal to said first deflecting means for scanning said light on said display screen in a second direction to produce a two-dimensional display of spots representative of said at least one modulated light source.

2. An optical scanning system according to claim 1 wherein said second light deflecting means is a means for scanning said band of display spots on said display screen to produce a two-dimensional display of spots including a plurality of bands of spots.

3. An optical scanning system according to claim 1 wherein said at least one modulated light source is a plurality of independently modulated light sources and wherein said first light deflective means is a reflective means for deflecting the light from said plurality of sources across said display screen to produce a display of a plurality of rows of spots to form a band of display spots.

4. An optical scanning system according to claim 1 wherein said second light deflecting means is a reflecting means for scanning said band of display spots on said display screen to produce a two-dimensional display of spots including a plurality of bands of spots.

5. An optical scanning system according to claim 3 wherein said first reflective means is a multi-faceted mirror structure rotatable about a central axis.

6. An optical scanning system according to claim 5 wherein said second reflective means is a mirror structure rotatable about a central axis orthogonal to the axis of said first reflective means.

7. An optical system according to claim 3 wherein said texture surfaces surface to provide controlled scattering and wherein said texture is formed of a plurality of depressions having one dimension longer than another.

8. An optical system according to claim 3 wherein said display screen is curved.

* * * * *